(12) United States Patent
Li et al.

(10) Patent No.: US 12,345,914 B2
(45) Date of Patent: Jul. 1, 2025

(54) HOLLOW-CORE MICROSTRUCTURE OPTICAL FIBER PREFORM, OPTICAL FIBER AND METHOD FOR MANUFACTURING THEREOF

(71) Applicant: YANGTZE OPTICAL FIBRE AND CABLE JOINT STOCK LIMITED COMPANY, Hubei (CN)

(72) Inventors: Peng Li, Hubei (CN); Xiaobo Lan, Hubei (CN); Jie Luo, Hubei (CN); Qiaoli Tian, Hubei (CN); Lei Zhang, Hubei (CN); Xin Tan, Hubei (CN); Mingfeng Mao, Hubei (CN)

(73) Assignee: YANGTZE OPTICAL FIBRE AND CABLE JOINT STOCK LIMITED COMPANY, Hubei (CN)

(*) Notice: Subject to any disclaimer, the term of this patent is extended or adjusted under 35 U.S.C. 154(b) by 100 days.

(21) Appl. No.: 18/367,599

(22) Filed: Sep. 13, 2023

(65) Prior Publication Data
US 2024/0019630 A1 Jan. 18, 2024

(30) Foreign Application Priority Data
Jul. 15, 2022 (CN) .......................... 202210835015.4

(51) Int. Cl.
*G02B 6/02* (2006.01)
*C03B 37/012* (2006.01)

(52) U.S. Cl.
CPC .... *G02B 6/02328* (2013.01); *C03B 37/01208* (2013.01); *G02B 6/02304* (2013.01);
(Continued)

(58) Field of Classification Search
CPC ............ G02B 6/02328; G02B 6/03694; G02B 6/02304; G02B 6/3839
See application file for complete search history.

(56) References Cited

U.S. PATENT DOCUMENTS

| 10,527,782 B2 | 1/2020 | Lyngsøe et al. |
| 10,989,866 B2 | 4/2021 | Lyngsøe et al. |
| 2023/0040327 A1* | 2/2023 | Fiacco ............... G02B 6/02328 |

FOREIGN PATENT DOCUMENTS

| CN | 215066113 U | * 12/2021 | ............. G01N 21/01 |
| CN | 113905991 A | * 1/2022 | ......... C03B 37/0122 |

* cited by examiner

*Primary Examiner* — Eric Wong
(74) *Attorney, Agent, or Firm* — Troutman Pepper Locke LLP; Tim Tingkang Xia, Esq.

(57) ABSTRACT

The present disclosure provides a hollow-core microstructure optical fiber preform, an optical fiber, and a method for manufacturing thereof. An objective of the present disclosure is to introduce a support sheet into a nested structure unit of the hollow-core microstructure optical fiber preform, which not only increases the number of reflection surfaces without increasing the number of nested layers of glass tubes, but also achieves a more accurate positioning by the support sheet and improves manufacturing accuracy as compared to a tangential structure of nested glass tubes, such that the following technical problems, difficulty in controlling a curvature of reflection surfaces, low manufacturing accuracy, large difference between actual loss and theoretical loss, or poor batch consistency, in related anti-resonance optical fibers, caused by increasing the number of layers of (Continued)

nested microstructure units in order to increase the number of reflection surfaces, are solved.

18 Claims, 8 Drawing Sheets

(52) U.S. Cl.
CPC ..... *G02B 6/02338* (2013.01); *G02B 6/02366* (2013.01); *C03B 2203/16* (2013.01); *C03B 2203/42* (2013.01)

Embodiment 5

Embodiment 6

Embodiment 7    Embodiment 8

Embodiment 9    Embodiment 10

Embodiment 11

Embodiment 12  Embodiment 13

Embodiment 14

Embodiment 15  Embodiment 16

Embodiment 17  Embodiment 18

HOLLOW-CORE MICROSTRUCTURE OPTICAL FIBER PREFORM, OPTICAL FIBER AND METHOD FOR MANUFACTURING THEREOF

CROSS-REFERENCE TO RELATED APPLICATION

This application claims priority to Chinese Patent Application No. 202210835015.4, filed Jul. 15, 2022, which is hereby incorporated herein in its entirety by reference.

TECHNOLOGY FIELD

The present disclosure relates to technology field of optical fiber communication, and in particularly, to a hollow-core microstructure optical fiber preform, an optical fiber and a method for manufacturing thereof.

BACKGROUND

A hollow-core microstructure optical fiber has characteristics of simple structure, hollow-core single mode light conduction, and wide transmission spectrum, and has been significantly applied in the fields, such as light-filling matter interactions, nonlinear optics, gas detection, gas laser generation, optical fluid technology, etc. A fiber core light conduction with a large air hole has characteristics of ultra-low Rayleigh scattering, low nonlinear coefficient, and tunable chromatic dispersion, and may provide a higher laser damage threshold, such that the fiber core light conduction with a large air hole may be potentially applied in high-power laser transmission, ultraviolet/mid-infrared light transmission, pulse compression, optical solution transmission, etc. Since an air core has characteristics of ultra-low loss, low chromatic dispersion, low nonlinearity, and a propagation speed close to speed of light, the development of hollow-core optical fiber communication transmission and communication devices may be implemented, thereby laying a foundation for construction and development of a next generation of optical communication system having ultra-large capacity, low delay, and high speed.

Even though the hollow-core optical fiber has significant advantages in design and application, it has a transmission loss higher than that of a traditional quartz optical fiber. In recent years, the hollow-core optical fiber with a reasonable structural design based on an anti-resonance principle is surprisingly found out to effectively reduce transmission loss, and may be used as a communication optical fiber for ultra-long distance potentially. Further reduction in attenuation of the hollow-core microstructure optical fiber is still an important topic in the field of optical fiber manufacturing. Previous research have shown that such an optical fiber may have a lower loss than related conventional optical fiber at any wavelength by increasing the number of glass thin film layers based on structural design and controlling a curvature of each of the glass thin film layers.

In the related art, a cladding design with a negative curvature and a node-free structure are usually used to reduce attenuation of the hollow-core optical fiber. Document U.S. Ser. No. 10/989,866B2 provides a hollow-core photonic crystal optical fiber composed of an outer cladding layer region and seven hollow-core tubes around the outer cladding layer region. In the hollow-core photonic crystal optical fiber, each of the hollow-core tubes is welded to the outer cladding layer to form a ring, and the hollow-core tubes are not in contact with each other and has a distance to adjacent hollow-core tubes. Each of the hollow-core tubes has an average outer diameter d2 and an average inner diameter d1, and d1/d2 is equal to or greater than about 0.8, such that a curvature of glass thin films is controlled. In this way, the hollow-core optical fiber may have attenuation of 30 dB/km. However, the further reduction in attenuation by the curvature of reflection surfaces will be limited, resulting in limited applied scenarios. Thereupon, a series of technologies have emerged to achieve lower optical fiber attenuation by increasing the number of anti-resonance layers in cladded capillaries.

Document U.S. Ser. No. 10/527,782B2 provides that attenuation may be reduced to some extent by increasing the number of anti-resonance layers through nesting tangent capillaries. However, the number of the anti-resonance layers is only 5, resulting in that the attenuation thereof is still higher than that of the conventional quartz optical fiber, which cannot satisfy requirements of long-distance optical fiber transmission.

However, at present, since the number of structure unit layers continues to be increased to reduce the loss of an anti-resonance optical fiber, the manufacture of the optical fiber becomes difficult to control. Specifically, the difficulty to control the curvature of reflective thin films is increasing with increasing the number of the structure unit layers; and an operation to connect tangential circular tubes is difficult to control in manufacture, resulting in unsatisfactory consistency of multiple structure units. In general, current hollow-core microstructure anti-resonance optical fibers with multiple-layered reflection surfaces have low rate of finished products and poor batch consistency during an actual manufacturing process. The above problems have resulted in difficulty in mass production of low-loss anti-resonance optical fibers based on a current design.

SUMMARY

With respect to above defects or improvement requirements on prior technology, the present disclosure provides a hollow-core microstructure optical fiber preform, an optical fiber, and a method for manufacturing thereof. An objective of the present disclosure is to introduce a support sheet into a nested structure unit of the hollow-core microstructure optical fiber preform, which not only increases the number of reflection surfaces without increasing the number of nested layers of glass tubes, but also achieves a more accurate positioning by the support sheet and improves manufacturing accuracy as compared to a nested glass tubes with a tangential structure, such that the following technical problem in related anti-resonance optical fibers, such as difficulty in controlling a curvature of reflection surfaces, low manufacturing accuracy, large difference between actual loss and theoretical loss, or poor batch consistency, due to increasing the number of layers of a nested microstructure unit in order to increase the number of reflection surfaces, is solved.

In order to achieve the above objective, according to an aspect of the present disclosure, a hollow-core microstructure optical fiber preform is provided. The hollow-core microstructure optical fiber preform includes: a cladding hollow-core sleeve, and a plurality of nested structure units arranged on an inner wall of the cladding hollow-core sleeve, wherein the nested structure units are used to form an air fiber core region with a size of a tangential circle of the nested structure units; each of the nested structure units includes a multi-layered nested glass tube; and a support sheet is provided between at least one group of adjacently nested glass tubes in the multi-layered nested glass tube; and the support sheet is used to firmly fixes the adjacently nested glass tubes, such that the adjacently nested glass tubes form at least 7 reflection surfaces.

Preferably, in the hollow-core microstructure optical fiber preform, the support sheet is provided outside a normal of the reflection surfaces, and the normal of the reflection surfaces passes through a geometric center of a cross section of the preform.

Preferably, in the hollow-core microstructure optical fiber preform, the support sheet is provided parallel to a tangential direction of the reflection surfaces.

Preferably, in the hollow-core microstructure optical fiber preform, a pair of support sheets are provided between the adjacently nested glass tubes, and the pair of support sheets are symmetrically provided with respect to a normal direction of the reflection surfaces or with respect to a geometric center of the nested structure units.

Preferably, in the hollow-core microstructure optical fiber preform, at least one of the adjacently nested glass tubes has a circular cross section; preferably, an outer glass tube of the adjacently nested glass tubes has a circular cross section.

Preferably, in the hollow-core microstructure optical fiber preform, each of the nested structure units includes an inner glass tube and an outer glass tube which are con-centrically nested, each of the inner glass tube and the outer glass tube has a circular cross section; a pair of support sheets are provided between the inner glass tube and the outer glass tube, and the pair of support sheets are symmetrically provided along a diameter of the inner glass tube with respect to a normal direction of the reflection surfaces.

Preferably, the hollow-core microstructure optical fiber preform includes 4 or more nested structure units.

According to another aspect of the present disclosure, a method for manufacturing the hollow-core microstructure optical fiber preform is provided, and the method includes: assembling a nested structure unit, wherein for adjacently nested glass tubes with a support sheet, the support sheet and the nested glass tubes are fixed at a preset position in a preset direction from inside to outside; and assembling a cladding hollow-core sleeve, wherein a preset number of nested structure units are nested into a cladding hollow-core sleeve, such that the nested structure units and the cladding hollow-core sleeve are fixed at the preset position with the support sheet for positioning.

Preferably, in the method for manufacturing the hollow-core microstructure optical fiber preform, the assembling a nested structure unit includes: fixing firstly an inner glass tube with the support sheet by using an auxiliary die to maintain a relative position of the support sheet with the inner glass tube; and nesting then the inner glass tube fixed with the support sheet to an outer glass tube, and placing laterally the inner glass tube and the outer glass tube, such that the support sheet and the outer glass tube are located at preset positions and are fixed.

Preferably, in the method for manufacturing the hollow-core microstructure optical fiber preform, the positioning by the support sheet includes a cross sectional image method for machine vision positioning or an end face cover die for mechanical positioning.

According to another aspect of the present disclosure, a hollow-core microstructure optical fiber is provided, and the hollow-core microstructure optical fiber includes: a cladding outer sleeve with a plurality of nested microstructures, wherein the plurality of nested microstructures surround a center axis of the cladding outer sleeve to form a fiber core region; the nested microstructures are provided on an inner wall of the cladding outer sleeve and are fixed tangentially to the inner wall of the cladding outer sleeve; and each of the nested microstructures at least includes, from outside to inside, a first anti-resonance ring and a second anti-resonance ring which are nested with each other, a connection bridge is provided between the first anti-resonance ring and the second anti-resonance ring, and each of the nested microstructures has at least 7 reflection surfaces formed by the first anti-resonance ring and the second anti-resonance ring.

Preferably, in the hollow-core microstructure optical fiber, a cross section of the cladding outer sleeve with the plurality of nested microstructures is divided into a plurality of regions by an inner tangent circle of reflection surfaces of the plurality of nested microstructures with the same distance to an axis line of the hollow-core microstructure optical fiber, the plurality of regions, from inside to outside, includes: a fiber core region with a diameter of D0, a first anti-resonance ring with a diameter of D1, a second anti-resonance ring with a diameter of D2, and a connection bridge with a thickness of T0; and the diameter D0 of the fiber core region is in a range from 10 to 50 μm, preferably the diameter D0 of the fiber core region is in a range from 10 to 20 μm, or more preferably the diameter D0 of the fiber core region is in a range from 20 to 30 μm, or more preferably the diameter D0 of the fiber core region is in a range from 30 to 40 μm, or more preferably the diameter D0 of the fiber core region is in a range from 40 to 50 μm; and the first anti-resonance ring has an equivalent area S1 of 20 to 1600 μm2, and the second anti-resonance ring has an equivalent area S2 of 3 to 500 μm2; the first anti-resonance ring has a wall thickness T1 of 0.1 to 2.0 μm, and the second anti-resonance ring has a wall thickness T2 of 0.1 to 2.0 μm; and the connection bridge has a wall thickness T0 of 0.1 to 2.0 μm.

Preferably, in the hollow-core microstructure optical fiber, the reflection surfaces includes a positive curvature reflection surface and a negative curvature reflection surface, the positive curvature reflection surface has a curvature radius in a range from 0.2 to 150 μm, and the negative curvature reflection surface has a curvature radius in a range from −0.2 to −150 μm.

Preferably, in the hollow-core microstructure optical fiber, the first anti-resonance rings and/or the second anti-resonance rings are circular, elliptical, or 8-shaped.

Preferably, in the hollow-core microstructure optical fiber, a minimum distance g between the nested microstructures satisfies: $0 < g \leq 15$ μm; and a ratio $g/T_1$ of the minimum distance g between the nested microstructures to the wall thickness $T_1$ of the first anti-resonance rings is in a range from 5 to 20, or 1 to 6, or 15 to 25.

Preferably, in the hollow-core microstructure optical fiber, a refractive index of a material for the nested microstructures is less than 2.0, and more preferably less than 1.5.

Preferably, in the hollow-core microstructure optical fiber, the plurality of nested microstructures have different reflective properties therebetween, and preferably, the nested microstructures are different in shape, thickness, and/or size, such that a cross section of the hollow-core microstructure optical fiber is asymmetrical.

Overall, the above technical solutions of conceived in the present disclosure can achieve the following beneficial effects as compared to related art.

In the hollow-core microstructure optical fiber preform provided in the present disclosure, a support sheet is introduced into each of the nested microstructure units, which increases the number of reflection surfaces of the finally manufactured hollow-core microstructure optical fiber without increasing the number of nested layers. Meanwhile, the structure of the support sheet is obvious, which achieves an easier and accurate positioning during assembly of the hollow-core microstructure optical fiber preform as compared to a tangential structure, thereby improving manufacturing accuracy and batch consistency of the optical fiber preform. Therefore, on the one hand, since the number of reflection surfaces is increased, a loss of the hollow-core microstructure optical fiber is reduced; and on the other hand, since the manufacturing accuracy of the optical fiber preform is improved, the loss of the manufactured hollow-core microstructure optical fiber is close to a theoretical value, thereby comprehensively reducing the loss of the manufactured hollow-core microstructure optical fiber. The present disclosure provides new solutions and ideas for design and manufacture of broadband low-loss hollow-core optical fibers.

According to the method for manufacturing the hollow-core microstructure optical fiber preform provided in the present disclosure, difficulty of manufacturing a multi-layered nested glass tube is reduced by supporting with the support sheet, and manufacturing accuracy and batch consistency of the multi-layered nested glass tubes are achieved; and a plurality of nested structure units can be accurately fixed with the cladding hollow-core sleeve, by positioning with the support sheet in the nested glass tubes, thereby achieving high production accuracy and good batch consistency.

DETAILED DESCRIPTION OF THE EMBODIMENTS

Figure 1:
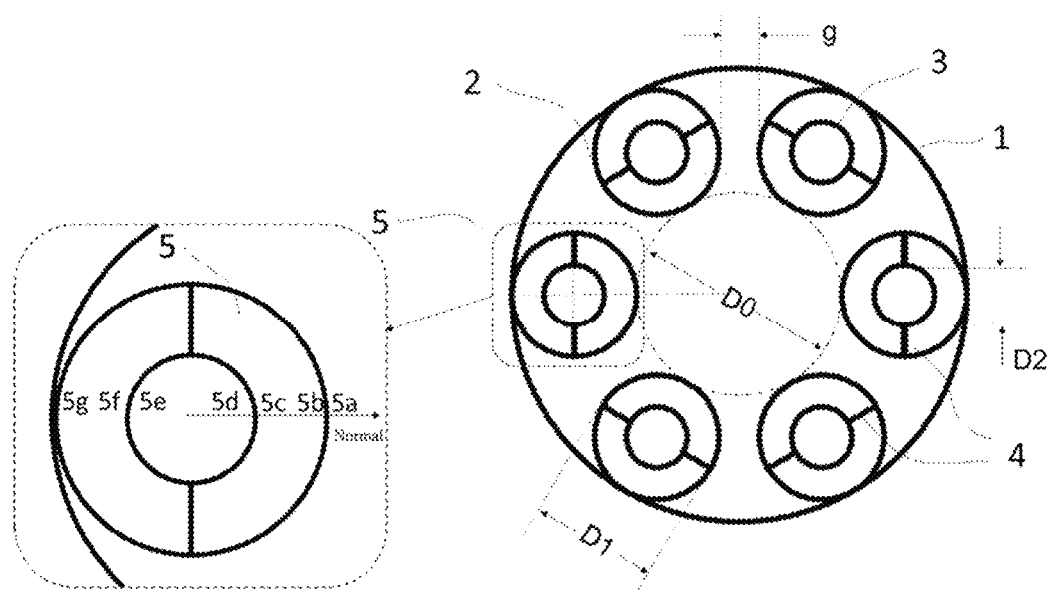
FIG. 1 is a schematic diagram of a structure of a hollow-core microstructure optical fiber provided in Embodiment 1 of the present disclosure.

In order to make the objectives, technical solutions, and advantages of the present disclosure clearer, the present disclosure will be further described below in detail in combination with the embodiments. It should be understood that, the specific embodiments described herein are only intended to explain the present disclosure, but are not intended to limit the present disclosure. In addition, technical features involved in the embodiments of the present disclosure described below may be combined with each other as long as they are not in conflict with each other.

A hollow-core microstructure optical fiber preform provided in the present disclosure includes a cladding hollow-core sleeve, and a plurality of nested structure units arranged on an inner wall of the cladding hollow-core sleeve. The nested structure units are used to form an air fiber core region with a size of a tangential circle of the nested structure units; and each of the nested structure units includes a multi-layered nested glass tube, preferably, 4 or more nested structure units. The cladding hollow-core sleeve is used to form a cladding outer sleeve for a hollow-core microstructure optical fiber; the nested structure units are used to form nested microstructures; and glass tubes are used to form anti-resonance rings.

A support sheet is provided between at least one group of adjacently nested glass tubes in the multi-layered nested glass tube; and the support sheet is used to firmly fixes the adjacently nested glass tubes, such that the adjacently nested glass tubes form at least 7 reflection surfaces. Preferably, the support sheet is provided outside a normal of the reflection surfaces, and the support sheet is preferably provided parallel to a tangential direction of the reflection surfaces; and the normal of the reflection surfaces passes through a geometric center of a cross section of the preform.

In a preferred solution, a pair of support sheets are provided between the adjacently nested glass tubes, and the pair of support sheets are symmetrically provided with respect to a normal direction of the reflection surfaces or with respect to a geometric center of the nested structure units.

In a current support solution for nested glass tubes, in order to avoid resonance (which will affect performance of optical fibers) generated by increasing or unevenness in thickness of glass due to use of node connection, a support solution in which an inner glass tube and an outer glass tube are tangent to each other is generally adopted. However, although this support solution can avoid influence due to thickness of nested glass tubes, at least 2 reflection surfaces will be reduced. Meanwhile, a circular outer wall of the nested structure units may result in that it is difficult to accurately fix the tangential connection point with an inner wall of a cladding hollow-core sleeve during manufacture of a preform, such that it extremely difficult to manufacture a microstructure optical fiber in practice. A design structure of an anti-resonance optical fiber is difficult to achieve in an actually manufactured optical fiber, and optical fiber attenuation thereof differs greatly from a theoretical analysis value, such that it is difficult to achieve mass production.

The support sheet not only may prevent tube walls of adjacently nested glass tubes from contacting to each other, so as to form more reflection surfaces, but also may be used for positioning, so as to accurately fix the nested structure units to the inner wall of the cladding hollow-core sleeve. A cross section of the support sheet preferably has a shape of a linear structure. In a preferred solution, a pair of support sheets are used, which are symmetrically provided with respect to the normal direction of the reflection surfaces and parallel to a tangent direction of the reflection surfaces, so as to reduce interference of the support sheet on the control of curvature and thickness of the reflection surfaces during drawing. In a support solution in which an inner glass tube and an outer glass tube are tangent to each other, a tangent point thereof is generally located on a reflection surface, and a thickness at the tangent point is determined by a sum of thicknesses of the inner glass tube and the outer glass tube, and this thickness is significantly greater than those positions of other reflection surfaces. Instead, the anti-resonance rings formed by the support sheet in the present disclosure are uniform in thickness, and more reflection surfaces are formed. Although more nodes will be introduced when the support sheet is used, the nodes are distributed by keeping away from the reflection surfaces as much as possible, for example, support sheets are provided on both sides of the normal direction of the reflection surfaces of the anti-resonance rings, which can effectively reduce adverse influence of the support sheet on optical fiber attenuation reduction. Overall, the present disclosure reduces optical fiber attenuation and achieves a small optical fiber attenuation difference between an actually manufactured optical fiber and a simulated optical fiber by a theoretical model.

In a preferred solution, at least one of adjacently nested glass tubes has a circular cross section; and preferably, an outer glass tube of the adjacently nested glass tubes has a circular cross section. From a cross-sectional perspective, circular glass tubes and support sheets with a linear structure can significantly improve symmetry of nested structure units, thereby reducing difficulty of manufacturing optical fiber preforms, and improving structural accuracy of low-loss optical fiber preforms. Comparatively, since the support sheets are provided inside the outer glass tube, and are relatively difficult to be nested and fixed, the circular cross section of the outer glass tube significantly contributes to the improvement of structural accuracy of optical fiber preforms.

A preferred method for manufacturing the hollow-core microstructure optical fiber preform provided in the present disclosure includes assembly of a nested structure unit and assembly of a cladding hollow-core sleeve.

During the assembly of a nested structure unit, for adjacently nested glass tubes with a support sheet, the support sheet and the nested glass tubes are fixed at a preset position in a preset direction from inside to outside. Specifically, firstly, an inner glass tube is fixed with the support sheet, preferably by melting solidification, and an auxiliary die may be used for fixing, to maintain a relative position of the support sheet and the inner glass tube; and then the inner glass tube fixed with the support sheet is nested into an outer glass tube, and they are placed laterally, so that the support sheet and the outer glass tube are located at predetermined positions and are fixed, preferably by melting solidification.

During the assembly of a cladding hollow-core sleeve, a preset number of nested structure units are nested into a cladding hollow-core sleeve, such that the nested structure units and the cladding hollow-core sleeve are fixed at the preset position with the support sheet for positioning. The positioning by the support sheet includes a cross sectional image method for machine vision positioning or an end face cover die for mechanical positioning.

For the hollow-core microstructure optical fiber preform provided in the present disclosure, during drawing, ventilation capacity of gas entering individual closed regions may be controlled, such that a curvature and thickness of reflection surfaces of an optical fiber cladded microstructure finally formed by drawing may be controlled. Thus, even for the same optical fiber preform, hollow-core microstructure optical fibers with different curvatures and thicknesses of reflection surfaces may be formed by drawing.

A hollow-core microstructure optical fiber provided in the present disclosure includes a cladding outer sleeve with nested microstructures. The nested microstructures surround a center axis of the cladding outer sleeve to form an fiber core region; the nested microstructures are provided on an inner wall of the cladding outer sleeve and are fixed tangentially to the inner wall of the cladding outer sleeve; and each of the nested microstructures at least includes, from outside to inside, a first anti-resonance ring and a second anti-resonance ring which are nested with each other, a connection bridge is provided between the first anti-resonance ring and the second anti-resonance ring, and each of the nested microstructures has at least 7 reflection surfaces formed by the first anti-resonance ring and the second anti-resonance ring.

a cross section of the cladding outer sleeve with the plurality of nested microstructures is divided into a plurality of regions by an inner tangent circle of reflection surfaces of the plurality of nested microstructures with the same distance to an axis line of the hollow-core microstructure optical fiber. The plurality of regions, from inside to outside, includes: a fiber core region with a diameter of $D_0$, a first anti-resonance ring with an area of $S_1$, a second anti-resonance ring with an area of $S_2$, and a connection bridge with a thickness of $T_0$. The diameter $D_0$ of the fiber core region is in a range from 10 to 50 μm, preferably the diameter $D_0$ of the fiber core region is in a range from 10 to 20 μm, or more preferably the diameter $D_0$ of the fiber core region is in a range from 20 to 30 μm, or even more preferably the diameter $D_0$ of the fiber core region is in a range from 30 to 40 μm, or even further more preferably the diameter $D_0$ of the fiber core region is in a range from 40 to 50 μm. An equivalent area $S_1$ of the first anti-resonance ring is in a range from 20 to 1600 μm², and an equivalent area $S_2$ of the second anti-resonance ring is in a range from 3 to 500 μm². A wall thickness $T_0$ of the connection bridge is in a range from 0.1 to 2.0 μm.

The reflection surfaces includes a positive curvature reflection surface and a negative curvature reflection surface, the positive curvature reflection surface has a curvature radius in a range of 0.2 to 150 μm, and the negative curvature reflection surface has a curvature radius in a range of −0.2 to −150 μm, such that the first anti-resonance ring and/or the second anti-resonance ring are circular, elliptical, or 8-shaped.

A wall thickness $T_1$ of the first anti-resonance ring is in a range from 0.1 to 2.0 μm, and a wall thickness $T_2$ of the second anti-resonance ring is in a range from 0.1 to 2.0 μm.

A minimum distance g between the nested microstructures satisfies: $0 < g \le 15$ μm; and a ratio $g/T_1$ of the minimum distance g between the nested microstructures to the wall thickness $T_1$ of the first anti-resonance rings is in a range from 5 to 20, or 1 to 6, or 15 to 25.

A refractive index of a material for the microstructure is less than 2.0, and more preferably less than 1.5.

The hollow-core microstructure optical fiber according to the above design has low loss in conducing light at 0.25 μm to 3.5 μm, and may have a minimum optical propagation loss level≤50 dB/km, preferably ≤1 dB/km, and more preferably ≤0.1 dB/km.

The hollow-core microstructure optical fiber may be applied in scenarios, such as effective single mode transmission, low-mode or multimode transmission, nonlinear optics, gas detection, gas laser generation, polarization maintenance, and the like.

In particular, when used as a polarization maintaining optical fiber, the plurality of nested microstructures have different reflection properties. Preferably, the nested microstructures are different in shape, thickness, and/or size, such that a cross section of the hollow-core microstructure optical fiber is asymmetrical, thereby achieving greater birefringence performance, with a birefringence $\ge 10^{-5}$, preferably $\ge 10^{-4}$, and more preferably $\ge 10^{-3}$.

In the following, some embodiments are provided.

Embodiment 1

A hollow-core optical fiber preform provided in this embodiment includes a cladding hollow-core sleeve, and six nested structure units uniformly arranged on an inner wall of the cladding hollow-core sleeve. The cladding hollow-core sleeve is used to form a cladding outer sleeve of a hollow-core microstructure optical fiber. The nested structure units are used to form a nested microstructure. Glass tubes are used to form anti-resonance rings.

The nested structure units are used to form an air fiber core region with a size of a tangential circle of the nested structure units. In this embodiment, each of the nested structure unit includes 2 circular glass tubes which are coaxially nested, and a support sheet is provided between inner and outer glass tubes to firmly fix adjacently nested glass tubes, thereby forming 7 reflection surfaces by the inner and outer glass tubes.

In this embodiment, two support sheets are provided in a direction perpendicular to a normal direction of reflection surfaces and are connected with a first anti-resonance ring and a second anti-resonance ring. In this embodiment, the normal direction of the reflection surfaces is a radial direction passing through a geometric center of the optical fiber. The two support sheets are symmetrical with respect to the normal direction of the reflection surfaces and are far away from each other, and are provided parallel to a tangent direction of the reflection surfaces, such that nodes of the support sheets are far away from the reflection surfaces, and influence on the reflection surfaces is reduced. Meanwhile, the support sheets per se also play a role of reflection surfaces to some extent, thereby contributing to reduction of attenuation.

A method for manufacturing the hollow-core microstructure optical fiber preform provided in this embodiment may include assembly of the nested structure unit and assembly of the cladding hollow-core sleeve.

Figure 2:
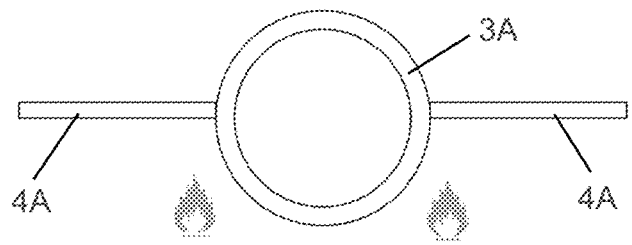
FIG. 2 is a schematic diagram of a structure in which support sheets are fixed with an inner glass tube, during manufacturing a hollow-core microstructure optical fiber preform in Embodiment 1 of the present disclosure.
Figure 3:
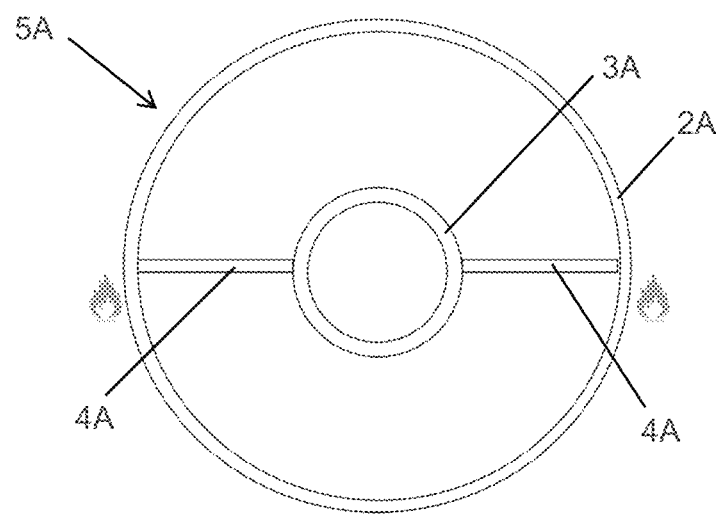
FIG. 3 is a schematic diagram of a structure in which support sheets are fixed with an outer glass tube, during manufacturing a hollow-core microstructure optical fiber preform in Embodiment 1 of the present disclosure.
Figure 19:
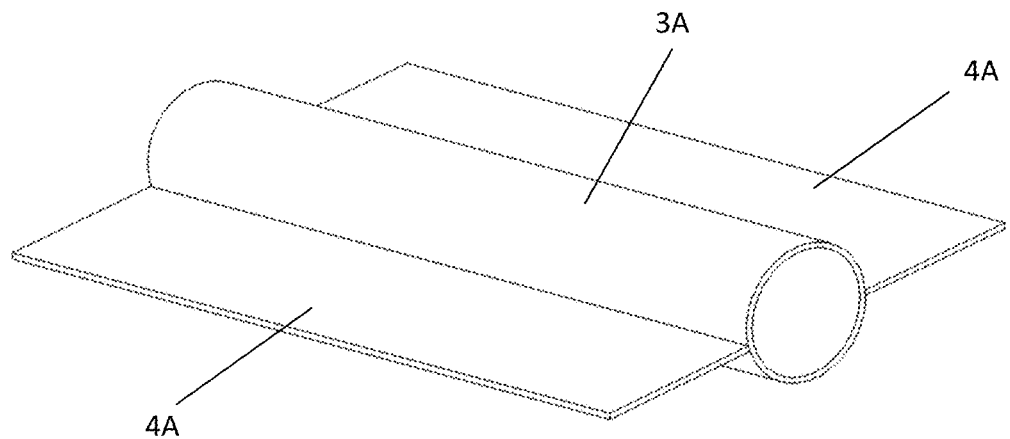
FIG. 19 is a schematic perspective view of the structure of the hollow-core microstructure optical fiber preform shown in FIG. 2.
Figure 20:
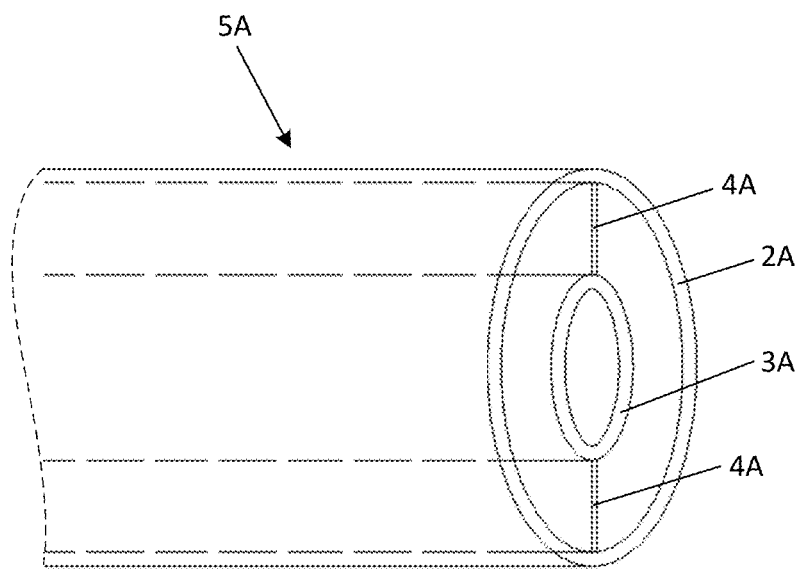
FIG. 20 is a schematic perspective view of the structure (i.e., nested structure unit) of the hollow-core microstructure optical fiber preform shown in FIG. 3.

During the assembly of the nested structure unit 5A, the support sheets 4A with a width of 1.5 mm and a thickness of 0.12 mm are fixed by using a die, along an outer extended line, on both sides of a pre-manufactured inner glass tube 3A with an outer diameter of 3.2 mm and a wall thickness of 0.12 mm, by melting solidification using oxyhydrogen flame or laser welding, as shown in FIG. 2, and FIG. 19; and then the support sheets 4A and the inner glass tube 3A after fixed are inserted into a pre-manufactured outer glass tube 2A with an outer diameter of 6.3 mm and a wall thickness of 0.13 mm, and are fixed with the outer glass tube 2A by an end face die by melting solidification using oxyhydrogen flame or laser welding, as shown in FIG. 3, and FIG. 20.

Figure 21:
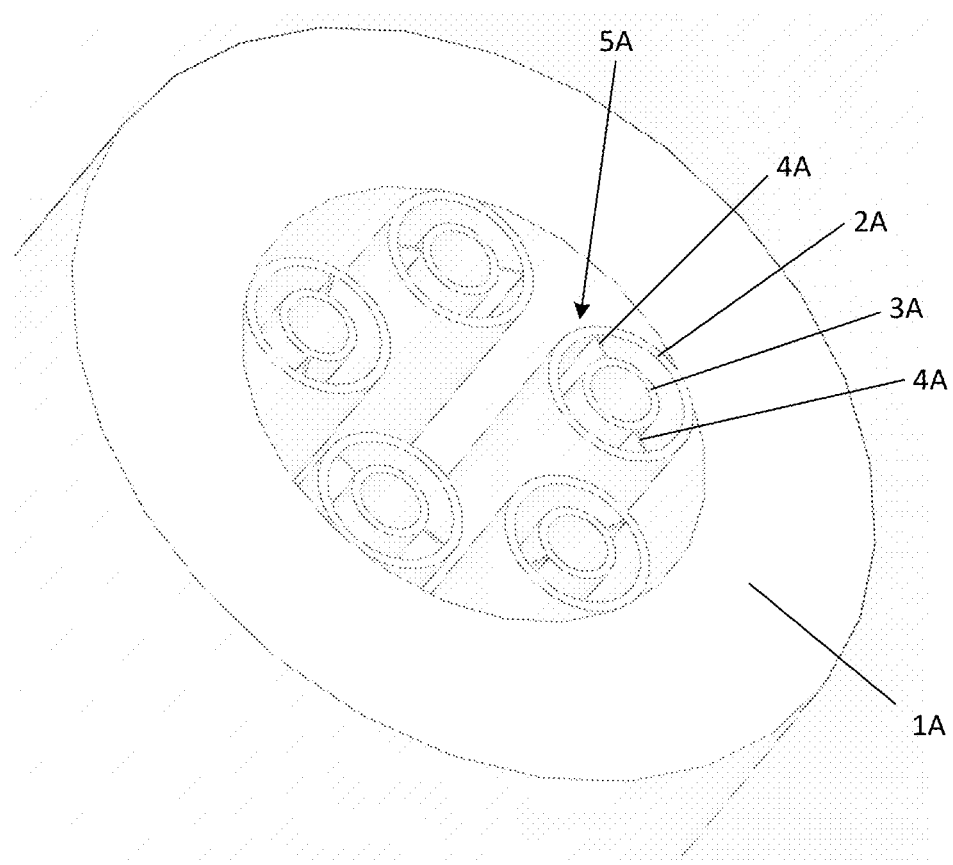
FIG. 21 is a schematic perspective view of a hollow-core microstructure optical fiber preform of the present disclosure.

During the assembly of cladding hollow-core sleeve 1A, six nested structure units 5A are sequentially inserted into and nested in the cladding hollow-core sleeve 1A, and after insertion of each nested structure unit 5A at each time, a machine vision positioning is performed. During the machine vision positioning, an image of partial or entire cross section of a pre-manufactured hollow-core microstructure optical fiber preform is projected in advance on a camera side, the inserted nested structure unit is located inside and at a bottom of the cladded hollow-core sleeve which is laterally placed, the microstructure unit is rotated to adjust the support sheets to locate at a position matching with the positions of the support sheets in the projected image of the cross-section, such that the nested structure unit may be positioned by the positions of the support sheets; after adjustment of the nested structure unit, the nested structure unit and the cladding hollow-core sleeve are fixed by melting solidification using oxyhydrogen flame or laser welding; and then the cladding hollow-core sleeve is rotated, such that the fixed nested structure unit is located at a projection position of other nested structure units in the projected image of the cross section, a next nested structure unit is inserted, and the above operations are repeated until all the nested microstructure units are fixed at preset positions. FIG. 21 is a perspective view of the hollow-core microstructure optical fiber preform.

In this embodiment, the cross-sectional image method is used for machine vision positioning, is not limited by a machining accuracy of an end face cover die, and achieves good accuracy and batch consistency.

Figure 15:
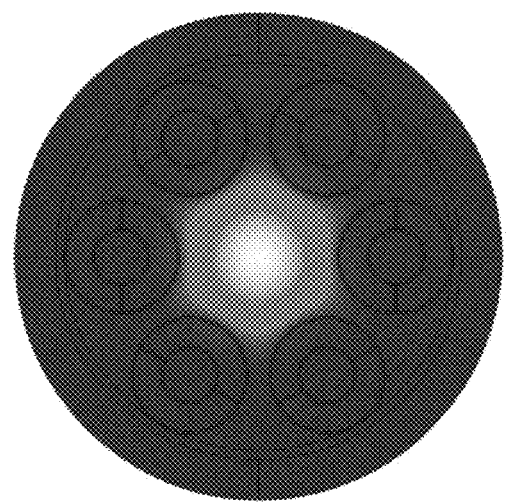
FIG. 15 is a schematic diagram of a mode field distribution of a hollow-core microstructure optical fiber provided in Embodiment 1 of the present disclosure.
Figure 16:
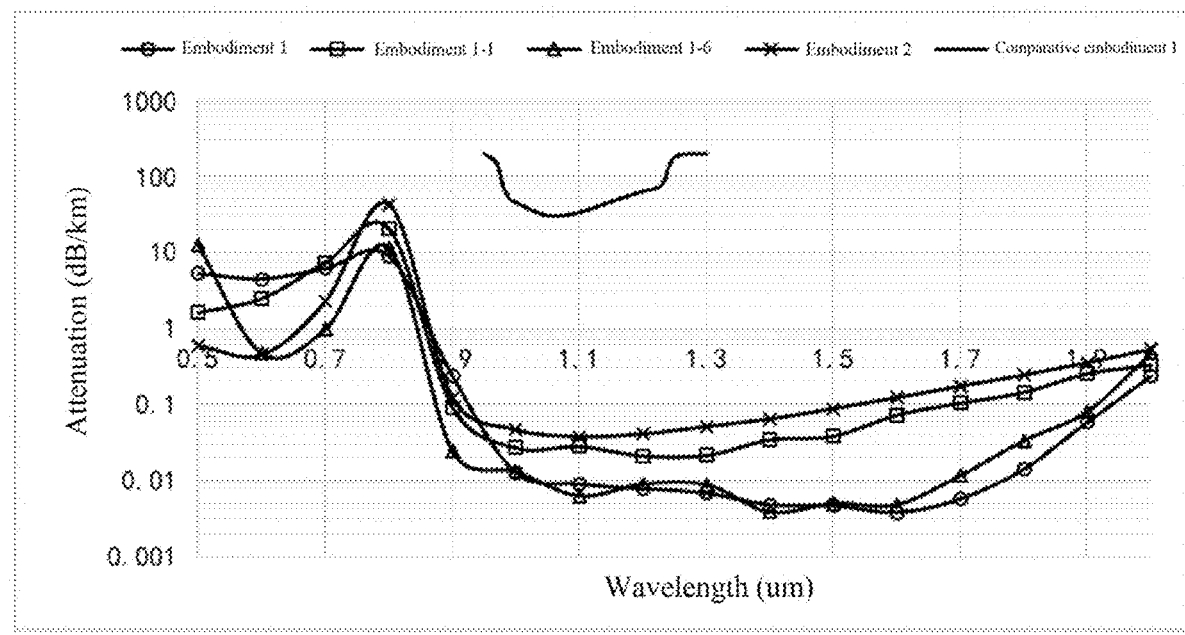
FIG. 16 is an attenuation spectrum of hollow-core microstructure optical fibers provided in Embodiments 1, 1-1, 1-6 and 2 of the present disclosure.

A hollow-core optical fiber drawn from the hollow-core optical fiber preform provided in this embodiment is shown in FIG. 1, and includes a cladding outer sleeve 1 with nested microstructure units 5. The nested microstructure units 5 form a fiber core region by surrounding a center axis of the cross section. A cladded region is composed of the cladding outer sleeve 1 and a plurality of nested microstructure units 5. Each of the nested microstructure units 5 includes a first anti-resonance ring 2 and a second anti-resonance ring 3 connected to the first anti-resonance ring 2 via a connection bridge 4. It should be noted that since the hollow-core optical fiber is drawn from the hollow-core optical fiber preform, the cladding outer sleeve 1 and the nested microstructure units 5 of the hollow-core optical fiber shown in FIG. 1 are respectively corresponding to the cladding hollow-core sleeve 1A and the nested structure units 5A of the hollow-core optical fiber preform shown in FIG. 21, and the first anti-resonance ring 2, the second anti-resonance ring 3 and the connection bridge 4 of each nested microstructure unit 5 of the hollow-core optical fiber shown in FIG. 1 are respectively corresponding to the outer glass tube 2A, the inner glass tube 3A and the support sheet 4A of each nested structure unit 5A of the hollow-core optical fiber preform shown in FIG. 21. A core layer region (i.e., the fiber core region) is surrounded by the nested microstructure units 5, and is a maximum inscribed circle (having a diameter $D_0$ of 34.5 μm) tangent to the nested microstructure units 5. The first anti-resonance ring has an equivalent area $S_1$ of 480 μm² and a wall thickness $T_1$ of 0.5 μm, and the second anti-resonance ring has an equivalent area $S_2$ of 122 μm² and a wall thickness $T_2$ of 0.45 μm. The connection bridges 4 has a thickness $T_0$ of 0.45 μm. The nested microstructure units 5 adjacent to each other have a spacing g of 4.4 μm therebetween. The addition of the second anti-resonance ring inside the first anti-resonance ring increases the number of anti-resonance layers, as shown in FIG. 1, the number of the anti-resonance layers is increased to 7 layers (from 5a to 5g), which is beneficial to reflecting more light from the cladding back to the core layer for transmission, thereby reducing optical fiber attenuation. The model optical fiber in Embodiment 1 has a mode field distribution at 1550 nm as shown in FIG. 15, and light is well constrained and transmitted in the hollow-core fiber core. The model optical fiber in Embodiment 1 has a loss varying with wavelength, as shown in FIG. 16, and has a minimum attenuation of 0.01 dB/km or less. As comparative example 1, attenuation in document U.S. Pat. No. 10,527,782B2 is presented in FIGS. 16 to 18. The anti-resonance optical fiber designed in the present disclosure has significantly lower attenuation by simulation.

Figure 4:
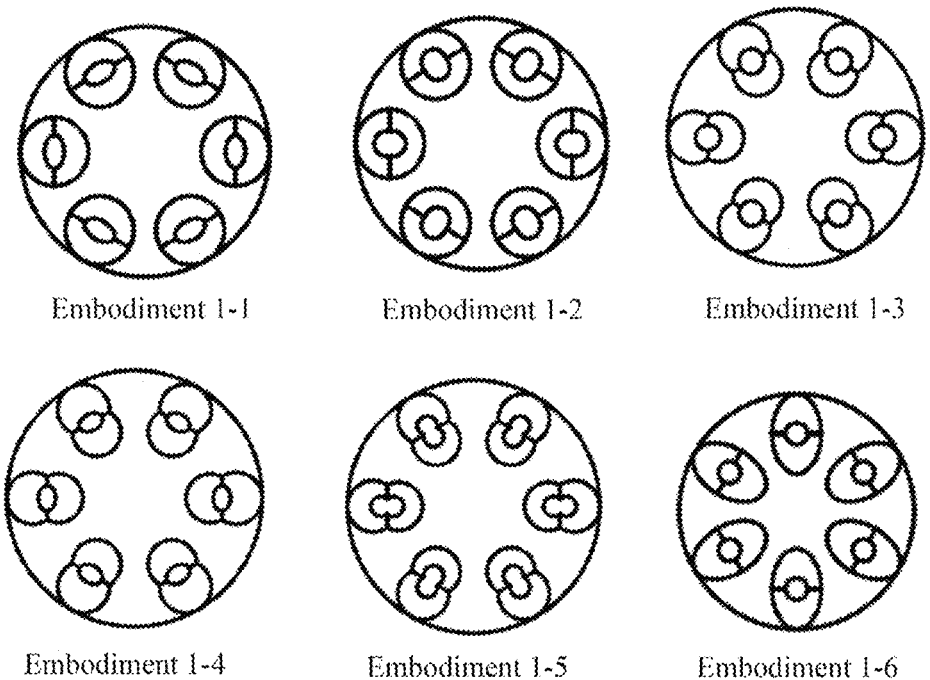
FIG. 4 is a schematic diagram of structures of hollow-core microstructure optical fibers provided in Embodiments 1-1 to 1-6 of the present disclosure.

A curvature and a thickness of reflection surfaces of an optical fiber cladded microstructure finally formed by drawing the hollow-core microstructure optical fiber preform provided in the present disclosure may be controlled by ventilation capacity of gas entering respective closed regions during drawing. As shown in FIG. 4, each of the hollow-core optical fibers with structures in Embodiments 1-1 to 1-6 has a structural deformation caused by drawing the hollow-core optical fiber preform in Embodiment 1; and the structural deformation includes, but not limited to, deformed first and second anti-resonance rings of a circle, an ellipse, runway-shape or "8"-shape, but the deformed first and second anti-resonance rings still have a hollow-core light transmission ability with low-loss. Attenuation curves of Embodiments 1-1 and 1-6 are shown in FIG. 16. Structural parameters of Embodiment 1 and Embodiments 1-1 to 1-6 are shown in Table 1 below, and a curvature radius 1, a curvature radius 2, a curvature radius 3 and a curvature radius 4 correspond to curvature radiuses of reflection surfaces 5a, 5c, 5e and 5g in their normal directions, respectively.

TABLE 1

| Embodiment | $D_0$ (μm) | $S_1$ (μm²) | $S_2$ (μm²) | $T_0$ (μm) | $T_1$ (μm) | $T_2$ (μm) | Curvature radius 1 | Curvature radius 2 | Curvature radius 3 | Curvature radius 4 |
|---|---|---|---|---|---|---|---|---|---|---|
| 1 | 34.5 | 479 | 122 | 0.5 | 0.45 | 0.45 | −12.35 | −6.25 | 6.25 | 12.35 |
| 1-1 | 33.1 | 510 | 134 | 0.52 | 0.45 | 0.57 | −13.42 | −67.8 | 67.8 | 13.42 |
| 1-2 | 33.5 | 444 | 129 | 0.51 | 0.45 | 0.46 | −14.32 | −1.3 | 1.3 | 14.32 |
| 1-3 | 34.3 | 543 | 133 | 0.47 | 0.42 | 1.4 | −16.56 | −7.54 | 7.54 | 16.56 |
| 1-4 | 33.5 | 482 | 119 | 0.23 | 0.33 | 0.28 | −13.25 | −10.45 | 10.45 | 13.25 |
| 1-5 | 33.9 | 528 | 143 | 0.64 | 0.78 | 0.69 | −16.23 | −2.30 | 2.30 | 16.23 |
| 1-6 | 34.1 | 510 | 118 | 0.34 | 0.33 | 0.38 | −8.92 | −5.34 | 5.34 | 8.92 |

Embodiment 2

Figure 5:
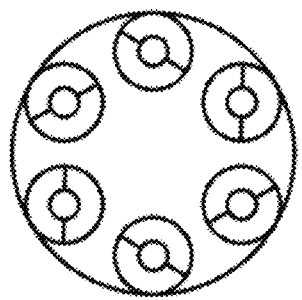
FIG. 5 is a schematic diagram of a structure of a hollow-core microstructure optical fiber provided in Embodiment 2 of the present disclosure.

A basic structure of the hollow-core optical fiber provided in this embodiment is the same as that in Embodiment 1 except an intersection angle between the connection bridge of the nested structure unit and the normal direction of the reflection surface. As shown in Embodiment 2 in FIG. 5, there is a certain angle between the connection bridge and the normal direction of the reflection surface. There is an angle of 60° between the connection bridge and the normal direction of the reflection surface. The core layer region has a diameter $D_0$ of 37.8 μm, the first anti-resonance ring has an equivalent area $S_1$ of 585 μm² inside the ring and a wall thickness $T_1$ of 0.64 μm, the second anti-resonance ring has an equivalent area $S_2$ of 190 μm² and a wall thickness $T_2$ of 0.76 μm, and the connection bridge has a wall thickness $T_0$ of 0.56 μm. An attenuation curve of Embodiment 2 is shown in FIG. 16.

Embodiments 3 and 4

Figure 6:
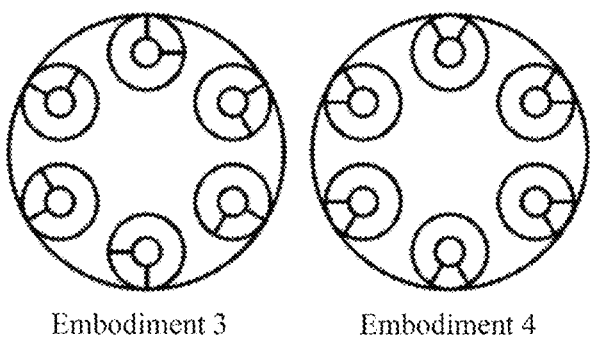
FIG. 6 is a schematic diagram of structures of hollow-core microstructure optical fibers provided in Embodiments 3 and 4 of the present disclosure.
Figure 17:
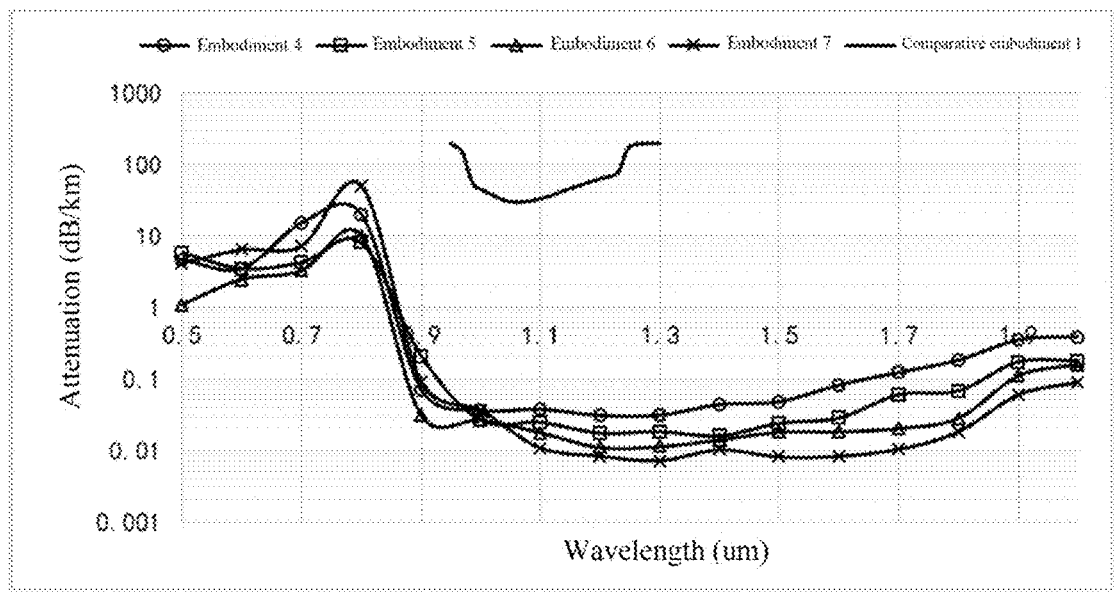
FIG. 17 is an attenuation spectrum of hollow-core microstructure optical fibers provided in Embodiments 4, 5, 6 and 7 of the present disclosure.

A basic structure of the hollow-core optical fiber provided in this embodiment is the same as that in Embodiment 1 except the distribution of the connection bridge of the nested structure unit. As shown in Embodiment 3 in FIG. 6, one connection bridge is provided along the normal direction and the other connection bridge is provided perpendicular to the normal direction in the same nested structure unit. The core layer region has a diameter $D_0$ of 36.4 μm, the first anti-resonance rings has an equivalent area $S_1$ of 540 μm² inside the ring and an wall thickness $T_1$ of 0.46 μm, the second anti-resonance ring has an equivalent area $S_2$ of 180 μm² and an wall thickness $T_2$ of 0.46 μm, and the connection bridge has a wall thickness TO of 0.51 μm. In Embodiment 4, there is an angle of 30° between the two connection bridges and the normal direction, respectively; the core layer region has a diameter $D_0$ of 31.3 μm, the first anti-resonance ring has an equivalent area $S_1$ of 448 μm² and a wall thickness $T_1$ of 0.68 μm, the second anti-resonance ring has an equivalent area S2 of 132 µm² and a wall thickness $T_2$ of 0.46 µm, and the connection bridge has a wall thickness TO of 0.59 µm. The attenuation curve of Embodiment 4 is shown in FIG. 17.

Embodiment 5

Figure 7:
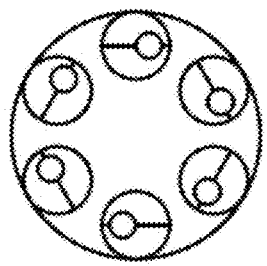
FIG. 7 is a schematic diagram of a structure of a hollow-core microstructure optical fiber provided in Embodiment 5 of the present disclosure.

A hollow-core optical fiber provided in this embodiment has an non-centrical nested microstructure the same as that in Embodiment 1 except a length and an angle between the connection bridge and the normal direction of the reflect surface in the same nested microstructure. As shown in Embodiment 5 in FIG. 7, the structure has a connection bridge provided at 90° with respect to the normal direction, and the length of a short connection bridge is ¼ of the length of a long connection bridge. The core layer region has a diameter $D_0$ of 33.2 µm, the first anti-resonance rings has an equivalent area $S_1$ of 515 µm² and a wall thickness $T_1$ of 0.77 µm, the second anti-resonance ring has an equivalent area $S_2$ of 155 µm² and a wall thickness $T_2$ of 0.56 µm, and the connection bridge has a wall thickness $T_0$ of 0.43 µm. The attenuation curve of Embodiment 5 is shown in FIG. 17.

Embodiment 6

Figure 8:
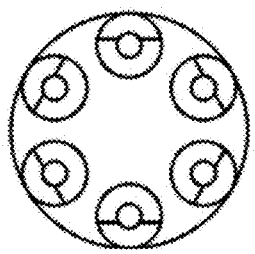
FIG. 8 is a schematic diagram of a structure of a hollow-core microstructure optical fiber provided in Embodiment 6 of the present disclosure.

A hollow-core optical fiber provided in this embodiment may have a connection bridge, located on a chord (not the diameter) of the outer circular glass tube, of the nested microstructure, such that the inner and outer circular glass tubes are con-centrically or non-centrically nested. As shown in FIG. 8, the connection bridge in Embodiment 6 is provided at 90° with respect to the normal direction, and has an offset from a center of the first anti-resonance ring by ⅙ of the diameter of the first anti-resonance ring. The core layer region has a diameter $D_0$ of 38.5 µm, the first anti-resonance rings has an equivalent area $S_1$ of 590 µm² and a wall thickness $T_1$ of 0.87 µm, the second anti-resonance ring has an equivalent area S2 of 187 µm² and a wall thickness $T_2$ of 0.69 µm, and the connection bridge has a wall thickness $T_0$ of 0.57 µm. The attenuation curve of the concentric nested solution in Embodiment 6 is shown in FIG. 17.

Embodiments 7 and 8

Figure 9:
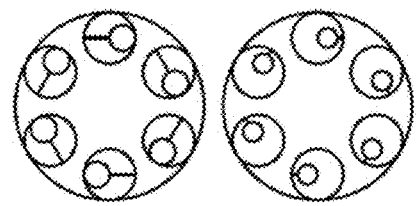
FIG. 9 is a schematic diagram of structures of hollow-core microstructure optical fibers provided in Embodiments 7 and 8 of the present disclosure.

7-layered anti-resonance surfaces may alternatively be implemented by only one connection bridge, and a structure of hollow-core optical fibers may be seen in FIG. 9. The connection bridge in Embodiment 7 is provided at 90° with respect to the normal direction, and has a length of ½ of the diameter of the first anti-resonance ring, the core layer region has a diameter $D_0$ of 31.6 µm, the first anti-resonance ring has an equivalent area $S_1$ of 488 µm² and a wall thickness $T_1$ of 0.42 µm, the second anti-resonance ring has an equivalent area $S_2$ of 122 µm² and a wall thickness $T_2$ of 0.52 µm, and the connection bridge has a wall thickness $T_0$ of 0.57 µm, The connection bridge in Embodiment 8 is provided at 90° with respect to the normal direction and has a length of ⅙ of the diameter of the first anti-resonance ring, the core layer region has a diameter $D_0$ of 25.8 µm, the first anti-resonance ring has an equivalent area $S_1$ of 443 µm² and a wall thickness $T_1$ of 0.75 µm, the second anti-resonance ring has an equivalent area $S_2$ of 114 µm² and a wall thickness $T_2$ of 0.63 µm, and the connection bridge has a wall thickness $T_0$ of 0.65 µm. The attenuation curve of Embodiment 7 is shown in FIG. 17.

Embodiments 9 and 10

Figure 10:
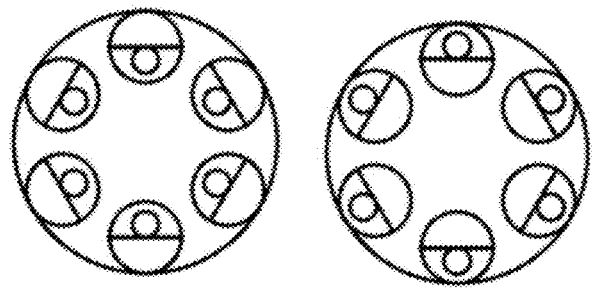
FIG. 10 is a schematic diagram of structures of hollow-core microstructure optical fibers provided in Embodiments 9 and 10 of the present disclosure.
Figure 18:
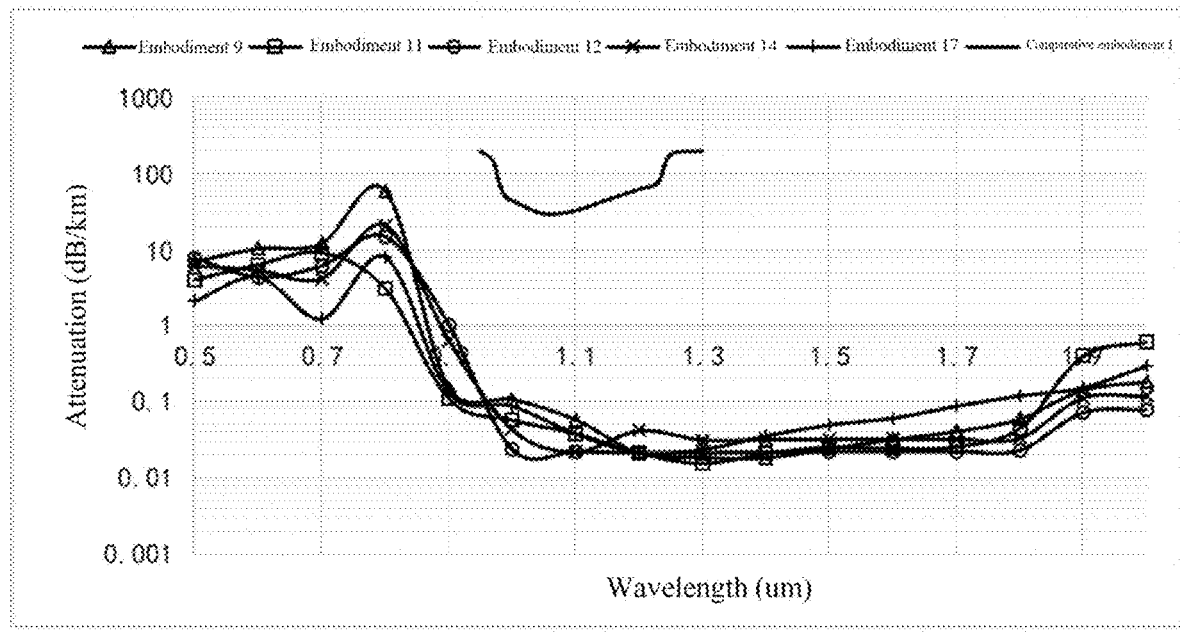
FIG. 18 is an attenuation spectrum of hollow-core microstructure optical fibers provided in Embodiments 9, 11, 12, 14 and 17 of the present disclosure.

As shown in FIG. 10, a connection bridge as a diameter is used to more accurately determine relative positions of the anti-resonance rings in the hollow-core microstructure, thereby enhancing consistency of the microstructure. The connection bridge in Embodiment 9 passes through the center of the first anti-resonance ring and is provided at 90° with respect to the normal direction, the second anti-resonance ring is fixed to a side close to the optical fiber core by the connection bridge, and the core layer region has a diameter $D_0$ of 28.9 µm, the first anti-resonance ring has an equivalent area $S_1$ of 457 µm² and a wall thickness $T_1$ of 0.52 µm, the second anti-resonance ring has an equivalent area $S_2$ of 83 µm² and a wall thickness $T_2$ of 0.48 am, and the connection bridge has a wall thickness $T_0$ of 0.64 µm. The connection bridge in Embodiment 10 passes through the center of the first anti-resonance ring and is provided at 90° with respect to the normal direction, the second anti-resonance ring is fixed to a side close to the outer cladding by the connection bridge, and the core layer region has a diameter $D_0$ of 29.6 µm, the first anti-resonance ring has an equivalent area $S_1$ of 460 µm² and a wall thickness $T_1$ of 0.86 am, the second anti-resonance ring has an equivalent area $S_2$ of 102 µm² and a wall thickness $T_2$ of 0.74 µm, and the connection bridge has a wall thickness TO of 0.79 µm. The attenuation curve of Embodiment 9 is shown in FIG. 18.

Embodiment 11

Figure 11:
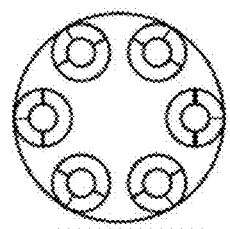
FIG. 11 is a schematic diagram of a structure of a hollow-core microstructure optical fiber provided in Embodiment 11 of the present disclosure.

Three or more connection bridges may be alternatively used for supporting the second anti-resonance ring. As shown in FIG. 11, Embodiment 11 has three connection bridges including a third connection bridge added along the normal direction to the structure of Embodiment 1, the core layer region has a diameter $D_0$ of 26.5 µm, the first anti-resonance ring has an equivalent area $S_1$ of 432 µm² inside the ring and a wall thickness $T_1$ of 0.41 µm, the second anti-resonance ring has an equivalent area $S_2$ of 113 µm² inside the ring and a wall thickness $T_2$ of 0.53 µm, and the connection bridge has a wall thickness $T_0$ of 0.55 µm. The attenuation curve of Embodiment 11 is shown in FIG. 18.

Embodiments 12 and 13

Figure 12:
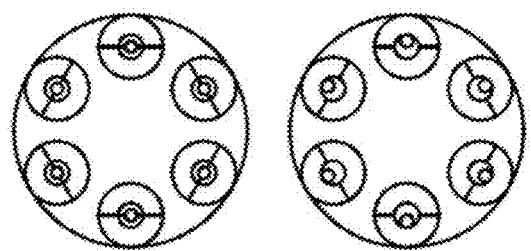
FIG. 12 is a schematic diagram of structures of hollow-core microstructure optical fibers provided in Embodiments 12 and 13 of the present disclosure.

More glass tubes may further be nested into the nested glass tubes to form more anti-resonance rings, as shown in Embodiment 12 and Embodiment 13 in FIG. 12, thereby achieving low loss. Embodiment 12 is implemented on Embodiment 1 by adding a third anti-resonance ring inside the second anti-resonance ring via the connection bridge, and the connection bridge between the first and second anti-resonance rings and the connection bridge between the second and third anti-resonance rings are provided along the same diameter, the core layer region has a diameter $D_0$ of 33.8 µm, the first anti-resonance ring has an equivalent area $S_1$ of 447 µm² and a wall thickness $T_1$ of 0.44 µm, the second anti-resonance ring has an equivalent area $S_2$ of 143 µm² and a wall thickness $T_2$ of 0.43 µm, the third anti-resonance ring has an equivalent area $S_3$ of 32 µm² and a wall thickness $T_3$ of 0.48 µm, and the connection bridge has a wall thickness $T_0$ of 0.54 µm. Embodiment 13 is implemented on Embodiment 1 by directly nesting a third anti-resonance ring inside the second anti-resonance ring, the third anti-resonance ring is provided inside the second anti-resonance ring by a tangential supporting with a tangent point at an intersection point of an outer side of the second anti-resonance ring with a radial direction of the optical fiber, the core layer region has diameter $D_0$ of 35.4 µm, the first anti-resonance ring has an equivalent area $S_1$ of 477 µm² and a wall thickness $T_1$ of 0.45 µm, the second anti-resonance ring has an equivalent area $S_2$ of 157 µm² and a wall thickness $T_2$ of 0.54 am, the third anti-resonance ring has an equivalent area $S_3$ of 38 µm² and wall thickness $T_3$ of 0.66 µm, and the connection bridges has a wall thickness $T_0$ of 0.57 µm. The attenuation curve of Embodiment 12 is shown in FIG. 18.

Embodiment 14

Figure 13:
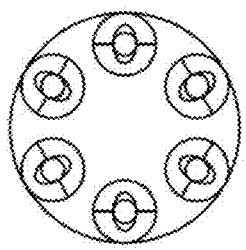
FIG. 13 is a schematic diagram of a structure of a hollow-core microstructure optical fiber provided in Embodiment 14 of the present disclosure.

An assembly of multi-layered nested structure units will be more difficult, but the use of connection bridges will greatly enhance manufacturing accuracy and stability of optical fiber drawing. Meanwhile, a combination of an ellipse and a circle may be used to achieve accurate multi-layered nested structures, as shown in FIG. 13. The second anti-resonance ring in Embodiment 14 is elliptical, the third anti-resonance ring is nested inside the second anti-resonance ring, and the third anti-resonance ring is circular and tangentially nested with the second anti-resonance ring. The core layer region has a diameter $D_0$ of 47.9 µm, the first anti-resonance ring has an equivalent area $S_1$ of 677 µm² and a wall thickness $T_1$ of 1.13 µm, the second anti-resonance ring has an equivalent area $S_2$ of 159 µm² and a wall thickness $T_2$ of 1.05 µm, the third anti-resonance ring has an equivalent area $S_3$ of 64 µm² and a wall thickness $T_3$ of 0.93 µm, and the connection bridges has a wall thickness $T_0$ of 0.89 µm. The attenuation curve of Embodiment 14 is shown in FIG. 18.

Embodiments 15 to 18

Figure 14:
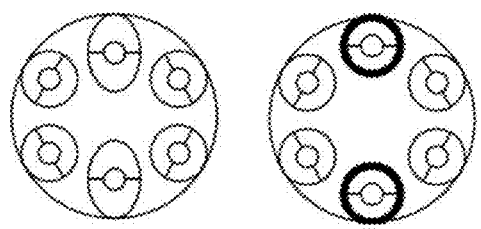
FIG. 14 is a schematic diagram of structures of hollow-core microstructure optical fibers provided in Embodiments 15 to 18 of the present disclosure.
Figure 14:
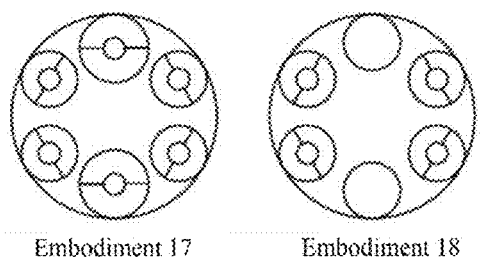

In addition, a symmetry of a structure of a hollow-core microstructure optical fiber is reduced by introducing capillaries with different shapes, different thicknesses, different sizes, and different numbers of reflective layers, thereby achieving superior birefringence performance, as shown in FIG. 14. For example, Embodiment 15 is implemented on the structure of Embodiment 1 by changing two symmetrical first anti-resonance rings from a circular shape to an elliptical shape, the elliptical shape has a major semi axis of 16.4 µm and a minor semi axis of 12.4 µm while remaining other parameters unchanged as in Embodiment 1, thereby achieving a birefringence of $4.5 \times 10^{-4}$. A hollow-core microstructure optical fiber shown in Embodiment 16 improves the birefringence performance of the hollow-core microstructure optical fiber by changing the thickness, and is implemented on the structure of Embodiment 1 by changing the wall thickness of the two symmetrically first anti-resonance rings to be 1.1 µm while remaining other parameters unchanged as in Embodiment 1, thereby achieving a birefringence of $3.7 \times 10^{-5}$. A hollow-core microstructure optical fiber shown in Embodiment 17 is implemented on the structure of Embodiment 1 by changing the equivalent area of two symmetrical first anti-resonance rings to be 570 µm² while remaining other parameters unchanged as in Embodiment 1, thereby achieving a birefringence of $5.3 \times 10^{-4}$. A hollow-core microstructure optical fiber shown in Embodiment 18 may be implemented on the structure of Embodiment 1 to achieve a superior birefringence by removing the two symmetrical second anti-resonance rings and the connection bridges thereof while remaining other parameters unchanged as in Embodiment 1, thereby achieving a birefringence of $1.8 \times 10^{-5}$. The attenuation curve of Embodiment 17 is shown in FIG. 18, indicating that the low loss transmission is achieved.

A manufacture of the preform in the above embodiments may alternatively be performed by using an end face cover die method. The end face cover die method includes: fixing the glass tube and the axial end face of the connection bridge on a die, assembling the glass tube and the connection bridge to form a nested structure unit, and fixing components of the nested structure unit by melting solidification; and assembling cladding hollow-core sleeve. The end face cover die has a cross section with a positioning slot corresponding to a position of the connection bridge of the designed hollow-core microstructure optical fiber preform, a plurality of nested structure units are fixed by positioning slots and then inserted into the outer cladding hollow-core sleeve, and the nested structure unit and the outer cladding hollow-core sleeve are fixed by melting solidification using goxyhydrogen flame or laser welding.

When the end face cover die method is used for assembly of the hollow-core microstructure optical fiber preform, although accuracy is limited by mechanical processing, a plurality of nested structure units may be simultaneously positioned, such that the method has high efficiency and is suitable for mass production of larger sized hollow-core optical fiber preforms.

Those skilled in the art may easily understand that the above description only illustrates preferred embodiments of the present disclosure, but is not intended to limit the present disclosure. Any modifications, equivalent substitutions, and improvements made within the spirit and principle of the present disclosure should be encompassed within the scope of protection of the present disclosure.

What is claimed is:

1. A hollow-core microstructure optical fiber preform, comprising:
    a cladding hollow-core sleeve and a plurality of nested structure units arranged on an inner wall of the cladding hollow-core sleeve,
    wherein the nested structure units are used to form an air fiber core region with a size of a tangential circle of the nested structure units; and
    wherein each of the nested structure units comprises a multi-layered nested glass tube having at least an outer glass tube and an inner glass tube nested in the outer glass tube; and at least one support sheet is provided between the adjacently nested inner and outer glass tubes in the multi-layered nested glass tube to firmly fix the adjacently nested inner and outer glass tubes along an axis (length) of the multi-layered nested glass tube, thereby forming at least seven (7) reflection surfaces by the adjacently nested inner and outer glass tubes after being drawn into fibers.

2. The hollow-core microstructure optical fiber preform of claim 1, wherein
    the at least support sheet is provided outside a normal of the reflection surfaces, and the normal of the reflection surfaces passes through a geometric center of a cross section of the preform.

3. The hollow-core microstructure optical fiber preform of claim 1, wherein
    the at least support sheet is provided parallel to a tangential direction of the reflection surfaces.

4. The hollow-core microstructure optical fiber preform of claim 1, wherein
    the at least one support sheet includes a pair of support sheets provided between the adjacently nested inner and outer glass tubes, and the pair of support sheets are symmetrically provided with respect to a normal direction of the reflection surfaces or with respect to a geometric center of the nested structure units.

5. The hollow-core microstructure optical fiber preform of claim 1, wherein
at least one of the adjacently nested inner and outer glass tubes has a circular cross section.

6. The hollow-core microstructure optical fiber preform of claim 1, wherein
the inner glass tube and the outer glass tube which are con-centrically nested, each of the inner glass tube and the outer glass tube has a circular cross section; the at least one support sheet includes a pair of support sheets provided between the inner glass tube and the outer glass tube, and the pair of support sheets are symmetrically provided along a diameter of the inner glass tube with respect to a normal direction of the reflection surfaces.

7. The hollow-core microstructure optical fiber preform of claim 1, wherein the plurality of nested structure units comprises four or more nested structure units.

8. A method for manufacturing the hollow-core microstructure optical fiber preform of claim 1, comprising:
assembling each of the plurality of nested structure units, wherein the at least one support sheet is fixed to the nested inner and outer glass tubes at a preset position in a preset direction from inside to outside; and
assembling the cladding hollow-core sleeve, wherein the plurality of nested structure units are nested into the cladding hollow-core sleeve, such that the nested structure units and the cladding hollow-core sleeve are fixed at the preset position with the support sheet for positioning.

9. The method of claim 8, wherein
the assembling each of the plurality of nested structure units comprises:
fixing firstly the inner glass tube with the support sheet by using an auxiliary die to maintain a relative position of the at least one support sheet with the inner glass tube; and
nesting then the inner glass tube fixed with the at least one support sheet to the outer glass tube, and placing laterally the inner glass tube and the outer glass tube, such that the at least one support sheet and the outer glass tube are located at preset positions and are fixed.

10. The method of claim 8, wherein
the positioning by the at least one support sheet comprises a cross sectional image method for machine vision positioning or an end face cover die for mechanical positioning.

11. A hollow-core microstructure optical fiber, comprising:
a cladding outer sleeve with a plurality of nested microstructures, wherein
the plurality of nested microstructures surround a center axis of the cladding outer sleeve to form a fiber core region; the nested microstructures are provided on an inner wall of the cladding outer sleeve and are fixed tangentially to the inner wall of the cladding outer sleeve; and
each of the nested microstructures at least comprises, from outside to inside, a first anti-resonance ring and a second anti-resonance ring which are nested with each other, a connection bridge is provided between the first anti-resonance ring and the second anti-resonance ring, and each of the nested microstructures has at least seven (7) reflection surfaces formed by the first anti-resonance ring and the second anti-resonance ring.

12. The hollow-core microstructure optical fiber of claim 11, wherein
a cross section of the cladding outer sleeve with the plurality of nested microstructures is divided into a plurality of regions by an inner tangent circle of reflection surfaces of the plurality of nested microstructures with the same distance to an axis line of the hollow-core microstructure optical fiber,
the plurality of regions, from inside to outside, comprises: a fiber core region with a diameter of $D_0$, the first anti-resonance ring with a diameter of $D_1$, the second anti-resonance ring with a diameter of $D_2$, and the connection bridge; and the diameter $D_0$ of the fiber core region is in a range from 10 to 50 μm; and
the first anti-resonance ring has an equivalent area $S_1$ of 20 to 1600 μm², and the second anti-resonance ring has an equivalent area $S_2$ of 3 to 500 μm²; the first anti-resonance ring has a wall thickness $T_1$ of 0.1 to 2.0 μm, and the second anti-resonance ring has a wall thickness $T_2$ of 0.1 to 2.0 μm; and the connection bridge has a wall thickness $T_0$ of 0.1 to 2.0 μm.

13. The hollow-core microstructure optical fiber of claim 11, wherein
the reflection surfaces comprise a positive curvature reflection surface and a negative curvature reflection surface, the positive curvature reflection surface has a curvature radius in a range from 0.2 to 150 μm, and the negative curvature reflection surface has a curvature radius in a range from −0.2 to −150 μm.

14. The hollow-core microstructure optical fiber of claim 11, wherein
the first anti-resonance ring and/or the second anti-resonance ring are circular, elliptical, or 8-shaped.

15. The hollow-core microstructure optical fiber of claim 12, wherein
a minimum distance g between the nested microstructures satisfies: $0 < g \leq 15$ μm; and a ratio $g/T_1$ of the minimum distance g between the nested microstructures to the wall thickness $T_1$ of the first anti-resonance ring is in a range from 5 to 20, or 1 to 6, or 15 to 25.

16. The hollow-core microstructure optical fiber of claim 11, wherein
a refractive index of a material for the nested microstructures is less than 2.0.

17. The hollow-core microstructure optical fiber of claim 11, wherein
the plurality of nested microstructures has different reflective properties therebetween, such that a cross section of the hollow-core microstructure optical fiber is asymmetrical.

18. The hollow-core microstructure optical fiber of claim 16, wherein
the refractive index of the material for the nested microstructures is less than 1.5.

* * * * *